(12) United States Patent
Okochi

(10) Patent No.: US 7,678,012 B2
(45) Date of Patent: Mar. 16, 2010

(54) BICYCLE HUB GEARBOX

(75) Inventor: Hiroyuki Okochi, Osaka (JP)

(73) Assignee: Shimano Inc., Osaka (JP)

( * ) Notice: Subject to any disclaimer, the term of this patent is extended or adjusted under 35 U.S.C. 154(b) by 465 days.

(21) Appl. No.: 11/695,746

(22) Filed: Apr. 3, 2007

(65) Prior Publication Data

US 2007/0254767 A1  Nov. 1, 2007

(30) Foreign Application Priority Data

Apr. 28, 2006  (EP) .................................. 06008958

(51) Int. Cl.
*F16H 3/44* (2006.01)
(52) U.S. Cl. ..................................... 475/297
(58) Field of Classification Search .................. None
See application file for complete search history.

(56) References Cited

U.S. PATENT DOCUMENTS

| | | | |
|---|---|---|---|
| 2,372,734 A * | 4/1945 | Orr | 475/297 |
| 3,410,157 A * | 11/1968 | Livezey | 475/276 |
| 4,089,239 A * | 5/1978 | Murakami et al. | 475/276 |
| 4,479,404 A * | 10/1984 | Stockton | 475/149 |
| 5,273,500 A | 12/1993 | Nagano | |
| 5,527,230 A | 6/1996 | Meier-Burkamp | |
| 5,967,935 A * | 10/1999 | Park | 475/275 |
| 6,824,492 B2 * | 11/2004 | Tabata et al. | 475/276 |
| 7,294,088 B2 * | 11/2007 | Shim et al. | 475/276 |

FOREIGN PATENT DOCUMENTS

| | | |
|---|---|---|
| DE | 4142867 A1 | 7/1992 |
| DE | 19828829 A1 | 12/1999 |
| DE | 102004014239 A1 | 10/2005 |
| EP | 0383350 | 8/1990 |
| EP | 1571077 | 9/2005 |
| WO | WO-9724252 | 7/1997 |

* cited by examiner

*Primary Examiner*—Dirk Wright
(74) *Attorney, Agent, or Firm*—Global IP Counselors, LLP

(57) ABSTRACT

A bicycle hub gearbox comprises a first planetary gear mechanism and a second planetary gear mechanism and a tubular linking member. The second planetary gear mechanism is operatively coupled with the first planetary gear mechanism. The tubular linking member include a first toothed ring part engaged with the first planetary gear mechanism at a first axial region and a second toothed ring part engaged with the second planetary gear mechanism at a second axial region such that a permanent synchronization between the at least two planetary gear mechanisms is achieved. The first and second toothed ring parts have different diameters and being axially spaced apart.

14 Claims, 6 Drawing Sheets

BICYCLE HUB GEARBOX

CROSS-REFERENCE TO RELATED APPLICATIONS

This application claims priority under 35 U.S.C. §119 to European Patent Application No. 06 008 958.8, filed Apr. 28, 2006. The entire disclosure of European Patent Application No. 06 008 958.8 is hereby incorporated herein by reference.

BACKGROUND OF THE INVENTION

1. Field of the Invention

This invention generally relates to a bicycle hub gearbox for a multi-speed hub for a bicycle. More specifically, the present invention relates to a bicycle hub gearbox with at least a pair of planetary gear mechanisms.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle drive train.

Many bicycle hub assemblies include an internal power transmission mechanism having two or more power transmission paths, where each path is defined by unique gear combinations through which torque is transmitted. For example, a bicycle hub gearbox for a multi-speed hub with two planetary gear mechanisms is disclosed in document German Patent Publication No. 41 42 867 A1. The arrangement, as described in this publication, substantially includes a fixed shaft, a drive member and a hub sleeve, as well as a mechanism for transmitting the driving torque from the drive member to the hub sleeve. The transfer mechanism includes particularly a first planetary gear mechanism and a second planetary gear mechanism, which is arranged between the first planetary gear mechanism and the drive member, as well as one-way clutches and one-way sun gear clutches, wherein the planetary gear mechanisms are controlled in such a manner that the driving torque can be transmitted in different gear ratios. The actuation of the clutches, which work on the sun gears only in one direction, takes place through position-related connections of projections, which are formed at the fixed shaft, relative to the actuation elements, which are arranged at a movable shifting element at circumferential surfaces of the fixed shaft. Although the bicycle gearing according to this document functions by itself, it has disadvantages nonetheless. For example, when shifting the gears, undesirable noise can be generated and the rider can feel uncomfortable and unpleasant jerks. Moreover, the construction requires a relatively large dimension in the radial direction.

In view of the above, it will be apparent to those skilled in the art from this disclosure that there exists a need for an improved gearing mechanism. This invention addresses this need in the art as well as other needs, which will become apparent to those skilled in the art from this disclosure.

SUMMARY OF THE INVENTION

One object of the present invention to improve a bicycle hub gearbox of a multi-speed hub. In particular, the gear change should take place more comfortable for the rider and the riding sensation should be improved during a gear change. Further, a simple and compact gearing mechanism having a slim construction should be provided, which is still reliable in operation.

In accordance with one aspect of the present invention a bicycle hub gearbox is provided that basically comprises a first planetary gear mechanism and a second planetary gear mechanism and a tubular linking member. The second planetary gear mechanism is operatively coupled with the first planetary gear mechanism. The tubular linking member include a first toothed ring part engaged with the first planetary gear mechanism at a first axial region and a second toothed ring part engaged with the second planetary gear mechanism at a second axial region such that a permanent synchronization between the at least two planetary gear mechanisms is achieved. The first and second toothed ring parts have different diameters and being axially spaced apart.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
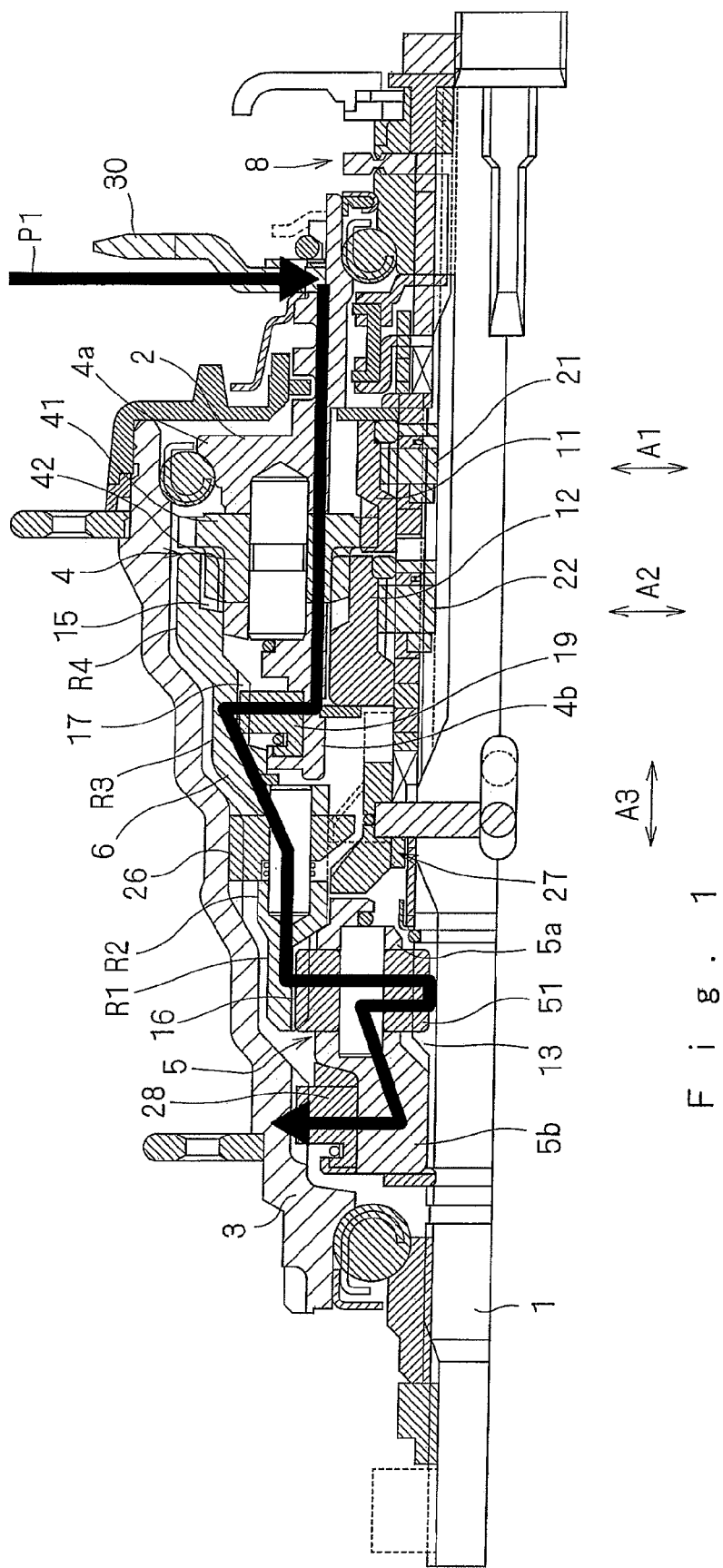
FIG. 1 is a partial longitudinal cross sectional view of a bicycle hub gearbox built in a multi-speed hub of a bicycle according to the present invention, showing the torque transfer path of the first gear ratio.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Referring initially to FIGS. 1 to 6, a multi-speed bicycle hub is illustrated that is equipped with a bicycle gearing mechanism in accordance with a first embodiment of the present invention. The shown construction includes substantially, but not limited to, a fixed shaft 1 attached to a bicycle frame, a rotatable driving member 2, a rotatable hub sleeve 3, a first planetary gear mechanism 4, a second planetary gear mechanism 5, a linking member 6, a first output clutch 26, a second output clutch 28, an output selector 27, and a chain wheel 30.

The first planetary gear mechanism 4 includes a preferably integrally-formed planet gear carrier which has an input side part 4a and an output side part 4b. In the present embodiment, the input side part 4a of the planet gear carrier 4a, 4b serves as the driving member 2 driven by the chain wheel 30. The first planetary gear mechanism 4 has a first sun gear 11 and a second sun gear 12, both being arranged longitudinally unmovable on the fixed shaft 1. The first sun gear 11 can be brought into engagement with a plurality of first planet gears 41 (only one shown) and the second sun gear 12 with a plurality of second planet gears 42 (only one shown). The first planet gears 41 have a larger diameter than the second planet gears 42. A sun gear clutch 21 is arranged between the sun gear 11 and the fixed shaft 1, while a sun gear clutch 22 is arranged between the sun gear 12 and the fixed shaft 1. The sun gear clutches 21 and 22 can be selectively controlled such that a driving torque is either transmitted or not transmitted to the sun gears 11 and 12. The sun gear clutches 21 and 22 are controlled by a control device 8 which is provided at the fixed shaft 1 and actuated by pulling a wire or the like (not shown) from the outside, wherein a rotational movement of the control device 8 results in an activation or deactivation of the sun gear clutches 21 and 22. By using the rotation, the control projections which are arranged in circumferential direction are suitably aligned, which is indicated by arrows A1 and A2 in FIG. 1. The control device 8 substantially extends from a input side end region of the fixed shaft 1 up to the output selector 27.

The sun gear clutches 21 and 22, and thus, the first planetary gear mechanism 4 can consequently be actuated by the control device 8 so that a plurality of gear ratios is provided. The planetary gear mechanism 4 is formed in a two-step manner. In particular, the planetary gear mechanism 4 has planet gear pairs, which have planet gears 41, 42 with different diameters.

The second planetary gear mechanism 5 includes a plurality of planet gears 51 (only one shown) and a planetary gear carrier, which includes an input side part 5a and an output side part 5b. The second planetary gear mechanism 5 is formed in a one-step manner. Therefore, the second planetary gear mechanism 5 does not have planet gears with different diameters. Moreover, the second planetary gear mechanism 5 is not controlled by using a sun gear clutch. The planet gears 51 are engaged with a sun gear 13 at the fixed shaft 1. The second output clutch 28 is arranged between the output side part 5b of the planetary gear carrier 5a, 5b and the hub sleeve 3, with the output clutch 28 can be configured as one way clutch. Both planetary gear carriers 4a, 4b and 5a, 5b, as shown in FIG. 1, are each formed integrally as a unit.

Figure 2:
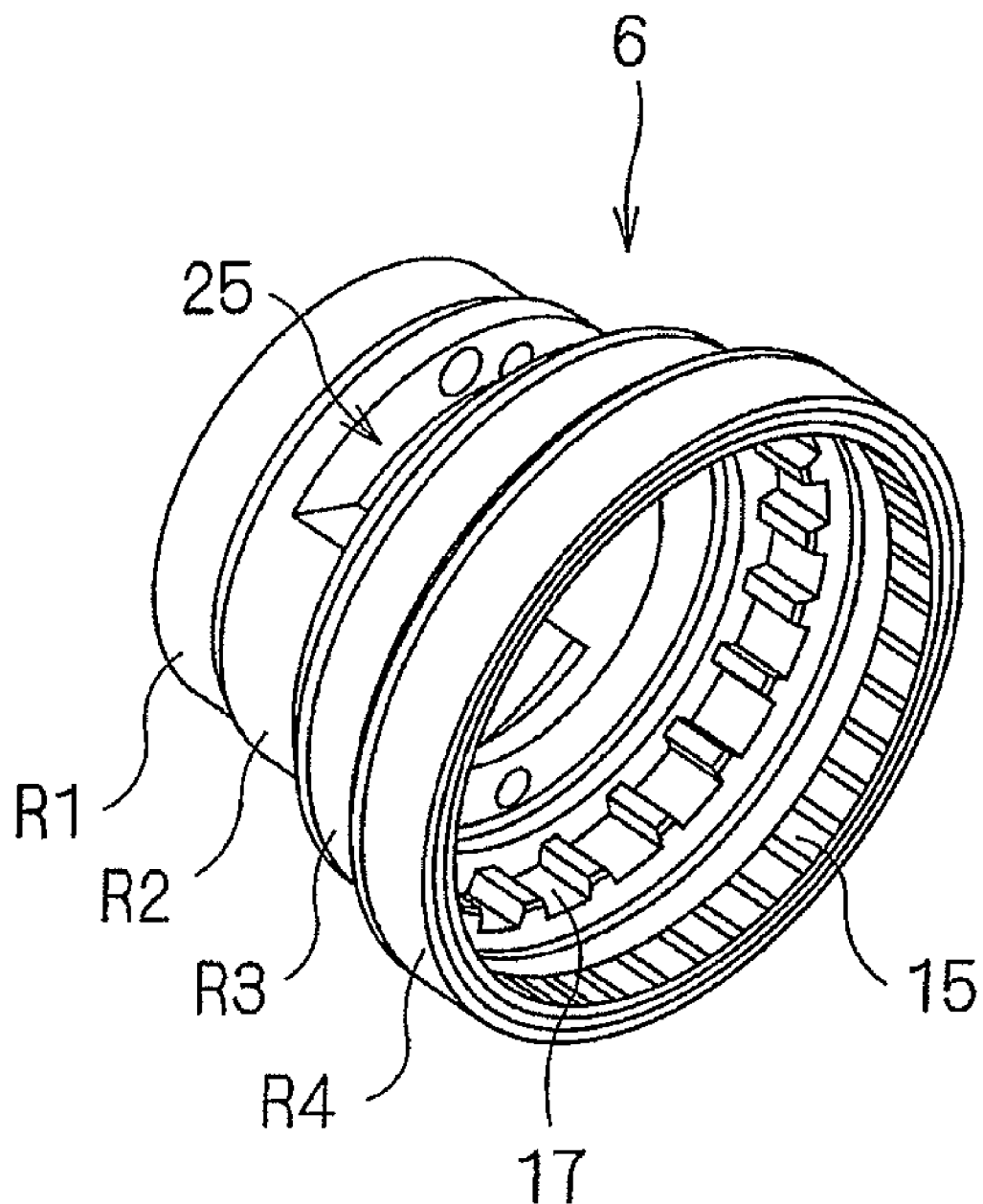
FIG. 2 is a perspective view of a linking member, which can be used in the gearing mechanism according to the present invention.

As it is shown in FIG. 1, an integrally formed linking member 6, which is also illustrated in a perspective view in FIG. 2, can be arranged between the first planetary gear mechanism 4 and the second planetary gear mechanism 5. The linking member 6 couples the first planetary gear mechanism 4 with the second planetary gear mechanism 5 such that a permanent synchronization between the two planetary gear mechanisms 4, 5 is achieved. The linking member 6 is a one-piece, unitary tubular member that includes, in the present embodiment, four different external diameters R1, R2, R3 and R4, which are formed respectively due to an oblique stepping or offset. The external diameter of the linking member 6 becomes smaller from the first planetary gear mechanism 4 to the second planetary gear mechanism 5. It is obvious to the skilled persons that a large external diameter corresponds to a large inner diameter and a small external diameter corresponds to a small inner diameter.

The linking member 6 has an inner toothed ring part 15 on its input side end which is engaged with the planet gears 42 and an inner toothed ring part 16 on its output side end which is engaged with the planet gears 51. Since the diameter of the linking member 6 at the input side end is larger than that at the output side end, the toothed ring part 15 consequently has a larger diameter than the toothed ring part 16. In the region between the first planetary gear mechanism 4 and the first output clutch 26, the linking member 6 includes at an inner surface a third toothed ring part 17. This third inner toothed ring part 17 in region R3 can be brought into engagement with a one way clutch 19. The clutch 19 is arranged between the third toothed ring part 17 and the output side part 4b of the planetary gear carrier 4a, 4b of the first planetary gear mechanism 4 such that they are operatively connected to each other. Preferably, the operative connection takes place by driving pawls, which are provided in peripheral recesses at the output side part 4b of the planetary gear carrier 4a, 4b and are biased towards the third toothed ring part 17. If a driving torque is to be transmitted, then the driving pawls come into a torque transferring engagement with the third toothed ring part 17. If no driving torque is to be transmitted, then the driving pawls slide over the third toothed ring part 17, without coming into a torque transferring engagement.

The first output clutch 26 is located output side of the third toothed ring part 17. The first output clutch 26 is engaged at both sides with the linking member 6 by a pair of shafts. As it is also illustrated in FIG. 2, the linking member 6 has a pair of peripheral recesses or passages 25, respectively, for receiving the shaft of the first output clutch 26 at both sides. Further, an output selector 27 is provided which can be actuated in longitudinally movable fashion by the control device 8, as it is indicated by arrow A3 in FIG. 1. By a suitable rotational movement of the control device 8, the output selector 27 is actuated in the longitudinal direction of the fixed shaft 1. In this way, the output to the hub sleeve 3 can be selectively controlled over either the first output clutch 26 or the second output clutch 28. In the present embodiment, by actuating the control device 8 and thereby controlling the sun gear clutches 21, 22 and the output selector 27, five different gear ratios can be provided.

The construction, as described above, makes it possible that the first planetary gear mechanism 4 and the second planetary gear mechanism 5 are linked with each other such that a permanent synchronization is achieved. By constructing the gearing mechanism according to the invention, gear change becomes more pleasant for the rider, whereby at the same time the riding sensation is improved during the gear change. This is possible, although the construction, as described, is simple, compact, slim and nevertheless reliable in operation.

Figure 3:
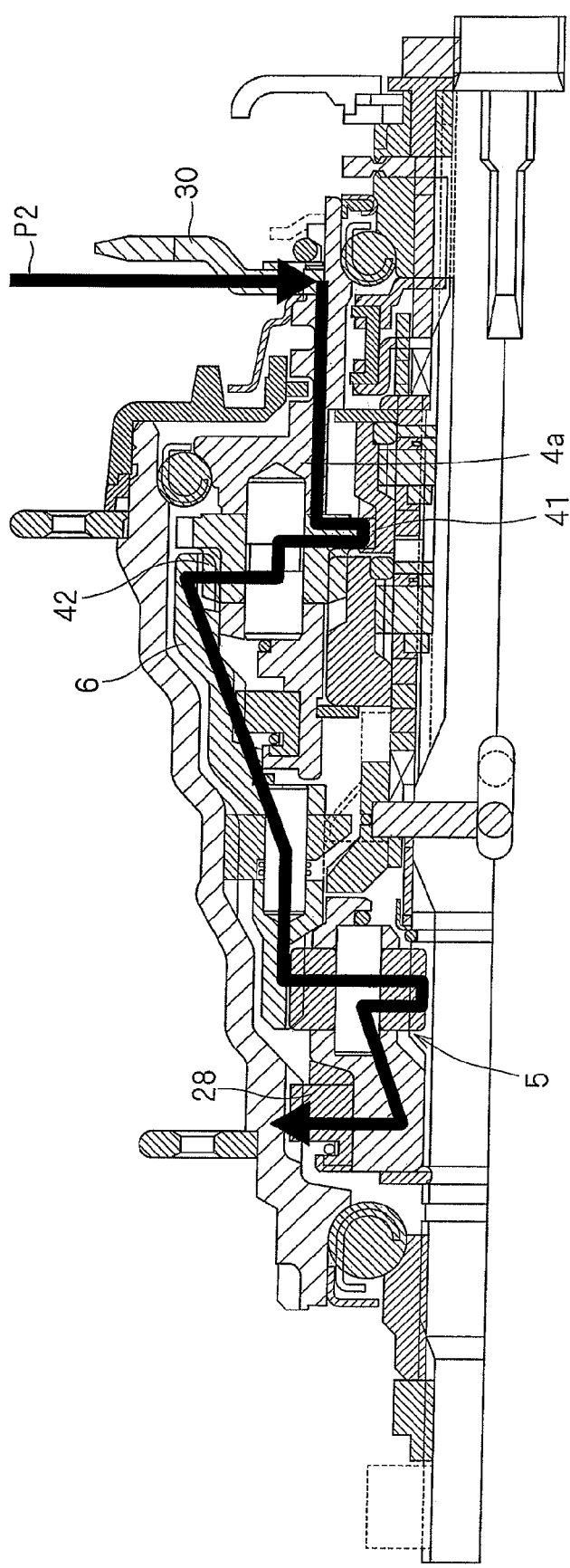
FIG. 3 is a partial longitudinal cross sectional view of the bicycle hub gearbox built in a multi-speed hub of a bicycle according to the present invention, showing the torque transfer path of the second gear ratio.
Figure 4:
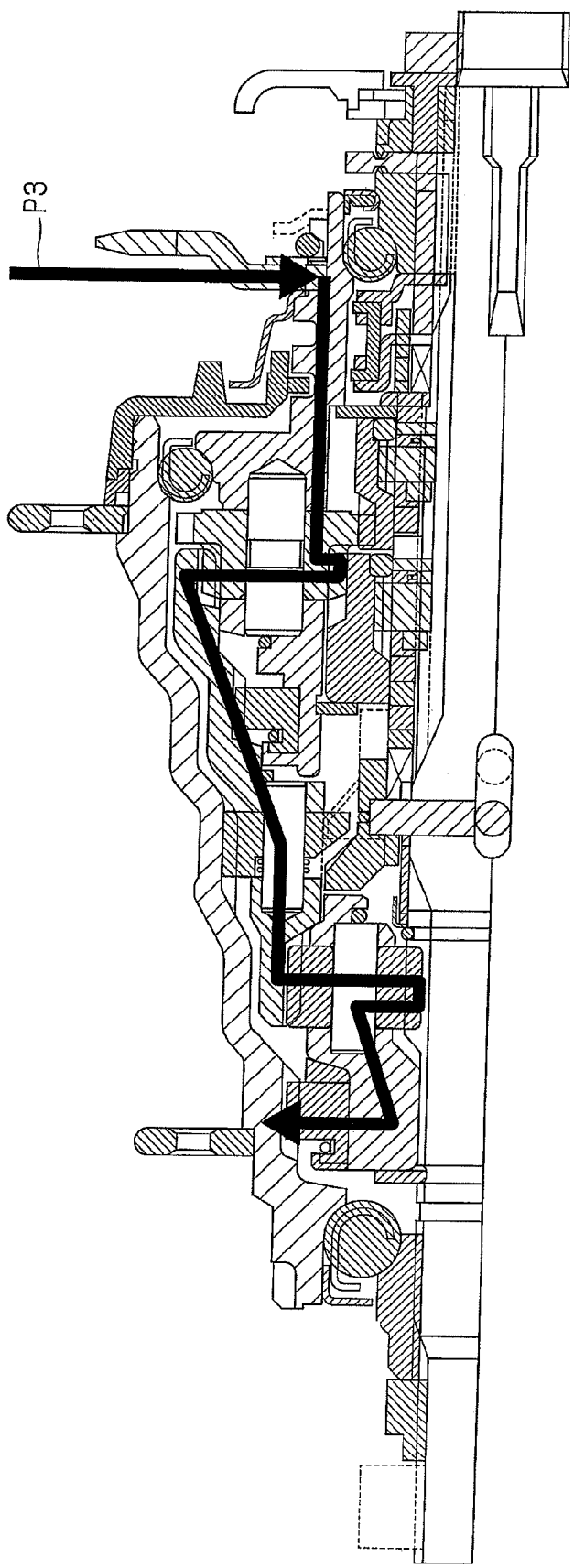
FIG. 4 is a partial longitudinal cross sectional view of the bicycle hub gearbox built in a multi-speed hub of a bicycle according to the present invention, showing the torque transfer path of the third gear ratio.
Figure 5:
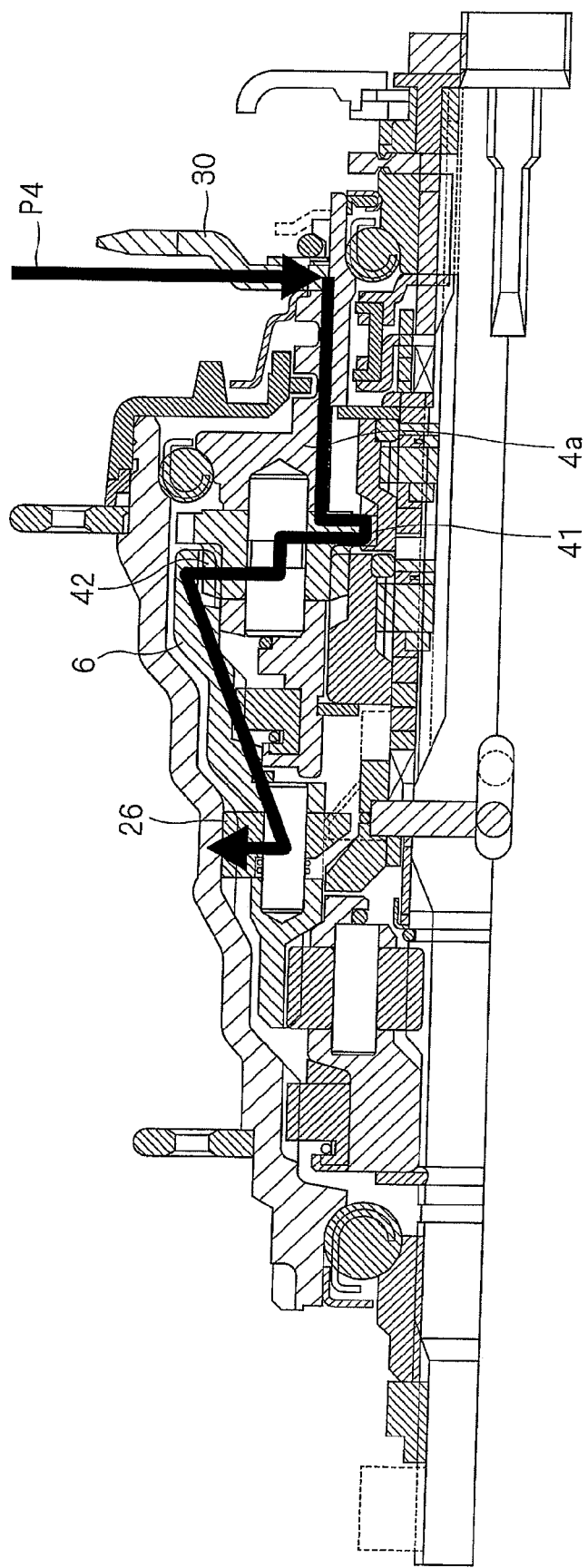
FIG. 5 is a partial longitudinal cross sectional view of the bicycle hub gearbox built in a multi-speed hub of a bicycle according to the present invention, showing the torque transfer path of the fourth gear ratio.
Figure 6:
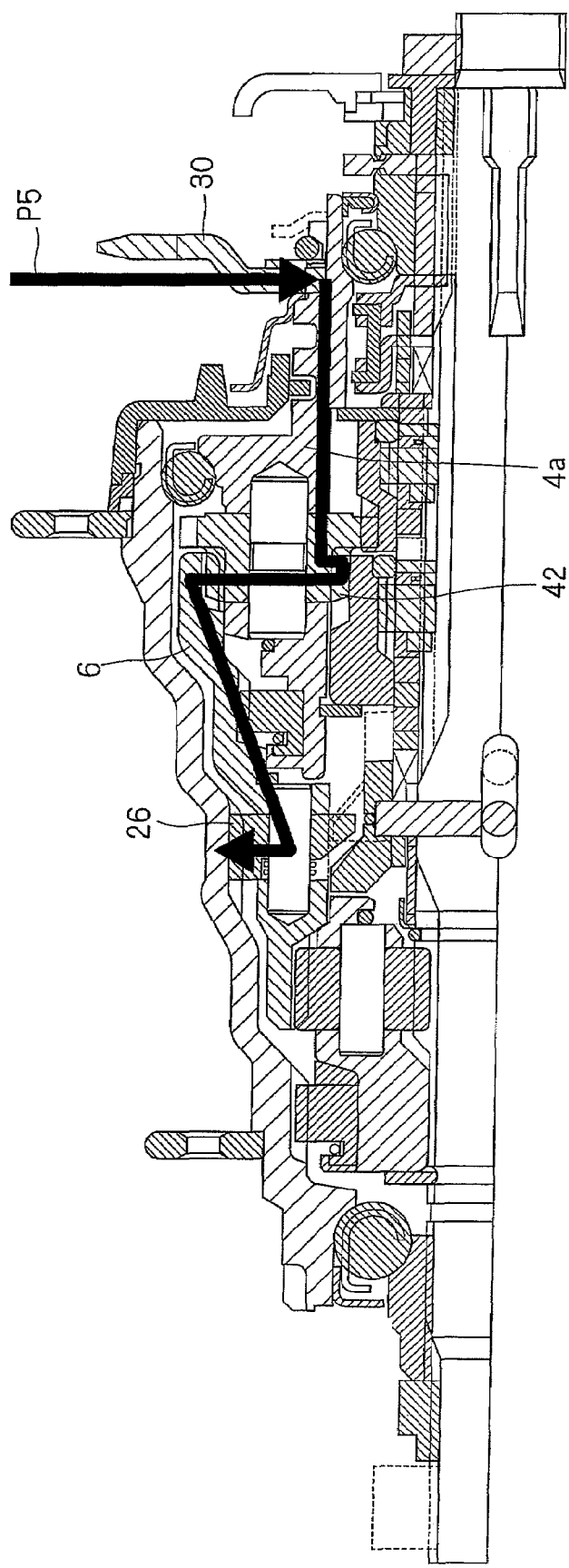
FIG. 6 is a partial longitudinal cross sectional view of the bicycle hub gearbox built in a multi-speed hub of a bicycle according to the present invention, showing the torque transfer path of the fifth gear ratio.

As shown in FIGS. 1 and 3 to 6, the driving torque, which is introduced by the driving member 2 (the input side part 4a of the planetary gear carrier 4a, 4b of the first planetary gear mechanism 4) is transmitted to the hub sleeve 3 over different paths. In FIGS. 3 to 6 only essential components are provided with reference number. A path DP1 in FIG. 1 represents the transmission path of the driving torque of the first gear ratio from the chain wheel 30 via the hub gearbox or gearing mechanism to the hub sleeve 3. A path DP2 in FIG. 3 represents the transmission path of the driving torque of the second gear ratio from the chain wheel 30 via the hub gearbox or gearing mechanism to the hub sleeve 3. A path DP3 in FIG. 4 represents the transmission path of the driving torque of the third gear ratio from the chain wheel 30 via the hub gearbox or gearing mechanism to the hub sleeve 3. A path DP4 in FIG. 5 represents the transmission path of the driving torque of the fourth gear ratio from the chain wheel 30 via the hub gearbox or gearing mechanism to the hub sleeve 3. A path DP5 in FIG. 6 represents the transmission path of the driving torque of the fifth gear ratio from the chain wheel 30 via the hub gearbox or gearing mechanism to the hub sleeve 3.

In the following table, a condition is indicated with the sign "-", in which the clutches are not in operating condition, which means that they do not transmit a driving torque. A condition is indicated with the sign "○", in which the clutches are in operating condition, which means that they transmit a driving torque. As it can be seen from FIGS. 1 and 3 to 6 together with the paths P1 to P5, the second output clutch 28 transmits a driving torque whenever the driving torque takes a path over the second planetary gear mechanism 5. The sign "X" indicates a condition, in which the second output clutch 28 transmits a driving torque. The sign "n" indicates a condition, in which the second output clutch 28 does not transmit a driving torque.

TABLE 1

| Gear Ratio (speed) | Clutch | | | | |
|---|---|---|---|---|---|
| | 21 | 22 | 19 | 26 | 28 |
| 1 | — | — | ○ | — | X |
| 2 | ○ | — | — | — | X |
| 3 | — | ○ | — | — | X |
| 4 | ○ | — | — | ○ | n |
| 5 | — | ○ | — | ○ | n |

From FIGS. 1 and 3 to 6, it becomes apparent that independent of the torque transmission paths P1 to P5, i.e. the gear ratio selected by the rider, the first planetary gear mechanism 4 is coupled permanently to the second planetary gear mechanism 5. Thus, synchronization between the two planetary gear mechanisms 4 and 5 is achieved. It is advantageous that the second planetary gear mechanism 5 need not be controlled by an elaborate mechanism which commonly comprises sun gear clutches controlled by a control device or a complicated clutch mechanism on its driving side. The second planetary gear mechanism 5 can therefore be engaged permanently with the linking member 6 and the sun gear 13, transmitting nevertheless a driving torque only in the first to third gear ratios in the present embodiment.

The embodiment, as described above, includes two planetary gear mechanisms. It will be obvious to the skilled persons that the invention is not restricted to two planetary gear mechanisms but can be also applicable for three or more planetary gear mechanisms. Moreover, the invention is not restricted to a first planetary gear mechanism which is formed in a two-step manner and a second planetary gear mechanism which is formed in a one-step manner. The number, the stepping as well as the positioning of the planetary gear mechanisms can be adapted to the respective requirements, as, for example, the number of gear ratios, step-up gearing/reduction gearing etc. The preferred integrally formed parts, as described herein, can also consist of multiple parts, when it is required.

In understanding the scope of the present invention, the foregoing also applies to words having similar meanings such as the terms, "including", "having" and their derivatives. Also, the terms "part," "section," "portion," "member" or "element" when used in the singular can have the dual meaning of a single part or a plurality of parts. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle hub gearbox comprising:
a first planetary gear mechanism;
a second planetary gear mechanism operatively coupled with the first planetary gear mechanism; and
a tubular linking member including a first toothed ring part engaged with the first planetary gear mechanism at a first axial region, a second toothed ring part engaged with the second planetary gear mechanism at a second axial region such that a permanent synchronization is achieved between the first and second planetary gear mechanisms, and a third toothed ring part disposed axially between the first and second toothed ring parts, the first and second toothed ring parts having different diameters and being axially spaced apart.

2. The bicycle hub gearbox according to claim 1, wherein the linking member has a larger external diameter on an input side than on an output side.

3. The bicycle hub gearbox according to claim 1, further comprising
a one way clutch is arranged between the third toothed ring part and an output side part of a planetary gear carrier of the first planetary gear mechanism such that the third toothed ring part is selectively engaged with an output side part of the first planetary gear carrier.

4. The bicycle hub gearbox according to claim 3, further comprising
a first output clutch including at least one shaft connecting the linking member at both sides to the third toothed ring part and to one of the first and second planetary gear mechanisms.

5. The bicycle hub gearbox according to claim 4, wherein the linking member is formed integrally as a one-piece, unitary member.

6. The bicycle hub gearbox according to claim 4, further comprising
a hub sleeve;
a second output clutch; and
an output selector arranged to be selectively actuated by a longitudinally displacement by a control device such that an output torque is transmitted to the hub sleeve via one of the first and second output clutches.

7. The bicycle hub gearbox according to claim 6, wherein the second output clutch is connected to an output side part of a planetary gear carrier of the second planetary gear mechanism.

8. The bicycle hub gearbox according to claim 7, wherein the first planetary gear mechanism includes an input side part of the planetary gear carrier that serves as a rotatable driving member to transmit an input torque to both of the first and second planetary gear mechanisms.

9. The bicycle hub gearbox according to claim 8, further comprising
at least one sun gear clutch is arranged between a sun gear of the first planetary gear mechanism and a fixed shaft, with the sun gear clutch being actuatable by a control device.

10. The bicycle hub gearbox according to claim 9, wherein
the linking member is configured to selectively transmit a driving torque introduced by the rotatable driving member depending on a selected gear ratio from the first planetary gear mechanism to the hub sleeve through either the first output clutch with the second output clutch being disengaged or the first output clutch to the second planetary gear mechanism via the second planetary gear carrier and the second output clutch.

11. The bicycle hub gearbox according to claim 10, wherein
the sun gear clutch and the output selector are actuatable by the control device to selectively attain a plurality of gear ratios.

12. The bicycle hub gearbox according to claim 11, wherein
the first planetary gear mechanism has two-steps and the second planetary gear mechanism has one step to provide a five-speed gear hub.

13. The bicycle hub gearbox according to claim 10, wherein
the first planetary gear mechanism has two-steps and the second planetary gear mechanism has one step to provide a five-speed gear hub.

14. The bicycle hub gearbox according to claim 1, wherein
the linking member is formed integrally as a one-piece, unitary member.

* * * * *